March 18, 1969 YOICHI KAWAHARAZAKI 3,433,486

PICKUP ARM CONTROL MECHANISM IN AN AUTOMATIC RECORD PLAYER

Filed May 16, 1966 Sheet 1 of 3

3,433,486

PICKUP ARM CONTROL MECHANISM IN AN AUTOMATIC RECORD PLAYER

Yoichi Kawaharazaki, Kamakura, Japan, assignor to Victor Company of Japan, Limited, Yokohama, Japan, a corporation of Japan Filed May 16, 1966, Ser. No. 550,375
Claims priority, application Japan, May 20, 1965, 40/29,316
U.S. Cl. 274—15 4 Claims
Int. Cl. G11b *17/06*

ABSTRACT OF THE DISCLOSURE

A pickup arm control mechanism in an automatic record player wherein the rotation of the pickup arm in the direction from the turntable to the rest position is obtained when the arm lever and the positioning plate are pushed by a horizontal pivoting lever. The rotation of the pickup arm in the direction from the rest position to the turntable being obtained through the pushing of the positioning plate and the arm lever by a follower lever in engagement with the horizontal pivoting lever. The rotation of the positioning plate in the direction from the rest position to the turntable being limited according to the size of records.

This invention relates to a pickup arm control mechanism in an automatic record player, and more particularly to a mechanism for automatically releasing a pickup arm from engagement with means for automatically moving the pickup arm horizontally in pivotal motion in an automatic record player wherein the pickup arm is automatically moved both horizontally and vertically.

In general, an automatic record player requires a pick-up arm control mechanism for automatically moving a pickup arm horizontally and vertically. The pick-up arm control mechanism must be constructed such that while a record is being played, said mechanism remains separated from, and independent of the pick-up arm lest the former should interfere with the movement of the latter.

It has hitherto been customary to rely on the vertical motion of a pickup arm for releasing a pickup arm control mechanism from engagement with the pickup arm. In prior art, when the pickup arm descends on a record after the former has moved in pivotal motion to a position above the lead-in groove of a record, the pickup arm is released from engagement with means for moving the pickup arm horizontally in pivotal motion by virtue of the operation of means for moving the pickup arm vertically which is performed at the same time.

A disadvantage of the prior art arrangement set forth hereinabove lies in the fact that the shock of releasing the pickup arm from the means for moving the pickup arm horizontally in pivotal motion is liable to cause the pickup arm to descend at an indefinite position on the record, unless the pickup arm is released from engagement with the means for moving the pickup arm horizontally in pivotal motion only after the pickup arm has actually descended on the record.

If only one record were automatically played, it would be possible to cause the pickup arm to descend on the record in timed relation to the releasing of the pickup arm from engagement with the means for moving the pickup arm horizontally in pivotal motion. In an automatic changer, however, wherein a number of records are successively played on a turntable, it is impossible to preform the two operations in timed relation to each other, because the surface of the uppermost record on the turntable is not uniform in height at all times.

Consequently, when the pickup arm descends on the surface of the uppermost record before the pickup arm is released from engagement with the means for moving the pickup arm horizontally in pivotal motion, the pickup arm may be caused to abruptly move by the rough pitch of the lead-in groove but prevented from doing so by the means for moving the pickup arm horizontally in pivotal motion, with the result that both the record and reproducing stylus suffer damage.

The present invention obviates this problem by releasing a pickup arm from engagement with means for moving the pickup arm horizontally in pivotal motion through the operation of the means for moving the pickup arm horizontally in pivotal motion, instead of relying on the operation of means for moving the pickup arm vertically for releasing the pickup arm. The invention is characterized in that a positioning plate adapted to vary its pivoting angle depending on the size of a record selected pushes the pickup arm in the direction of a turntable for pivotal motion, and a follower lever in engagement with a horizontally pivoting lever for moving the pickup arm horizontally in pivotal motion operates said positioning plate, said horizontally pivoting lever being released from engagement with the follower lever for pivotal motion independently of the follower lever after said positioning plate, and consequently the follower lever, have been arrested in their pivotal motion.

A principal object of this invention is to provide a pickup arm control mechanism which is conducive to flawless performance of an automatic record player.

Another object is to provide a pickup arm control mechanism which makes it possible to smoothly and dexterously release a pickup arm from engagement with means for moving the pickup arm horizontally in pivotal motion.

Other and further objects and features of the invention will become apparent after the description hereafter set forth is considered in conjunction with the drawings annexed thereto.

In all the figures, 11 is a spindle, 12 is a record, 13 is a turntable, 14 is a pickup arm, 16 is a reproducing stylus, and 17 is a motor board. 15 is a record size selecting knob which is to be described in some detail hereinbelow. The pickup arm 14 descends on the lead-in groove of a record selected if the knob 15 is turned and set at a suitable position depending on the size of a record to be selected.

Figures 1, 2:
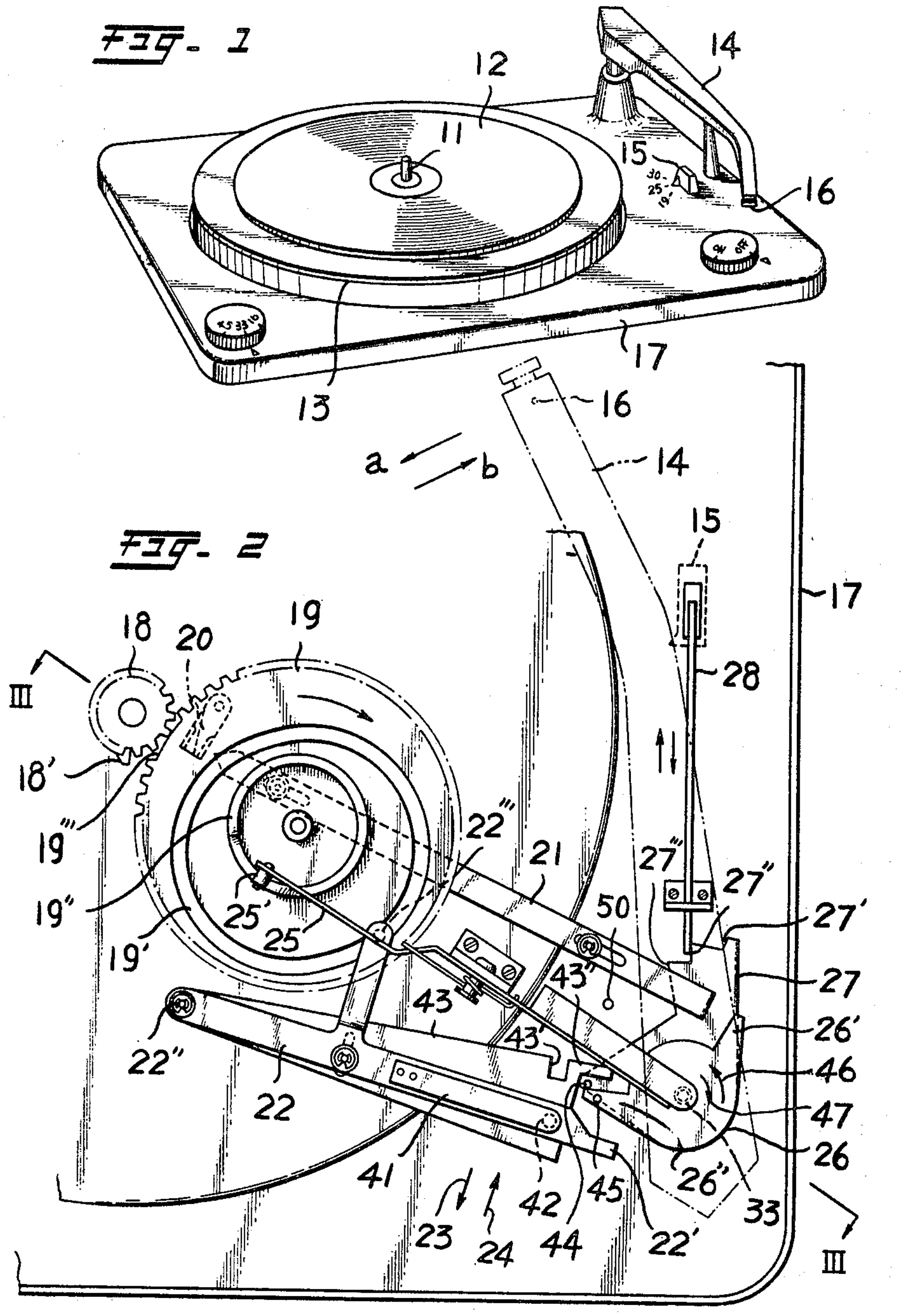
FIG. 1 is an exterior perspective view showing a conventional automatic record player.
FIG. 2 is a plan view as seen from below the underside of a motor board, showing one embodiment of the mechanism according to this invention.
Figures 3, 4, 5:
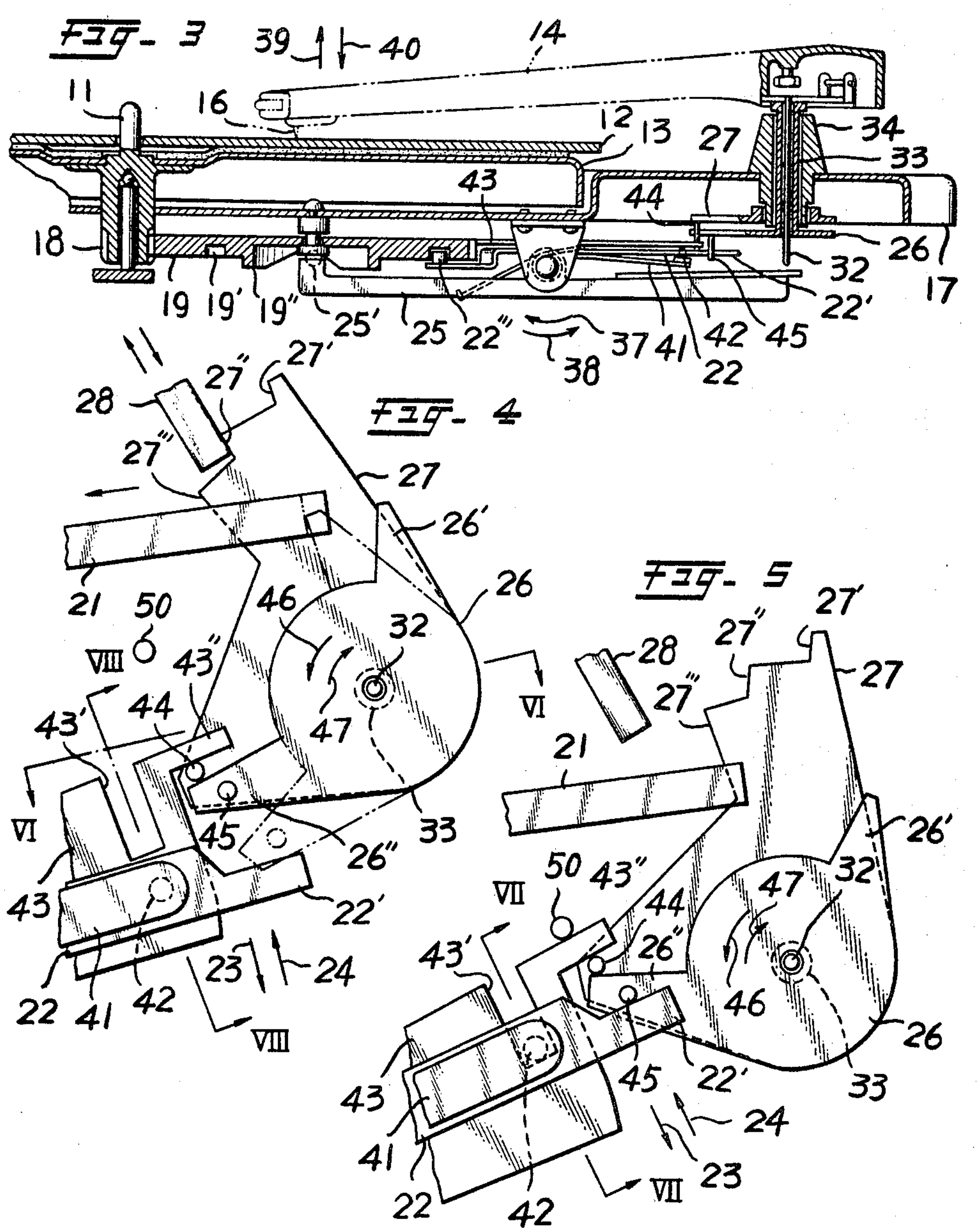
FIG. 3 is a longitudinal sectional view taken along the line III—III of FIG. 2.
FIG. 4 is a plan view showing means for moving a pickup arm horizontally in pivotal motion, with the essential portions of the mechanism of FIG. 2 being in a state immediately before the player begins to play a record.
FIG. 5 is a plan view showing means for moving a pickup arm horizontally in pivotal motion, with the pickup arm of the mechanism shown in FIG. 4 being positioned on a rest.

19 is a cam gear adapted to be operated when the player has finished playing a record. The cam gear 19 has an eccentric cam groove 19′ and a cam crest 19″. 22 is a horizontally pivoting lever for moving the pickup arm 14 horizontally in pivotal motion. The horizontally pivoting lever 22 is pivotally supported by a pin 22″ mounted on the motor board 17 and moved, by a follower 22‴ received in the cam groove 19′, in pivotal motion in the direction of arrows 23 and 24 (FIGS. 2, 4 and 5). A front end 22′ of the horizontally pivoting lever 22 is elongated such that it is able to push a pin 45 mounted on an arm lever 26 secured to a rotary shaft 33 for moving the pickup arm 14 horizontally in pivotal motion. 32 is a pickup arm push-up lever adapted to be pushed upwardly by a vertically pivoting lever 25 operated by virtue of the cam crest 19″. The arm lever 26 is provided with two arms 26′ and 26″, the arm 26′ being adapted to push a rod 21 for starting the cam gear 19.

A positioning plate formed to provide offset portions 27′, 27″ and 27‴ and adapted for positioning the pickup arm 14 on a record for initiating a performance is pivotally supported by a horizontally pivoting bearing 34. The positioning plate 27 is concentric with the rotary shaft 33 for moving the pickup arm 14 horizontally in pivotal motion. A pin 44 mounted on the positioning plate 27 is adapted to push the arm 26″ of the arm lever 26.

If the knob 15 is set at one of the three positions representing 17 cm., 25 cm. and 30 cm. for selecting a record size as desired, a rod 28 projects into a position in the path of movement of one of the offset portions 27′, 27″ and 27‴. A follower lever 43 is mounted on the pin 22″ which pivotally supports the horizontally pivoting lever 22, a front end 43″ of said follower lever 43 being elongated such that it is able to push the pin 44 mounted on the positioning plate 27.

Figure 6:
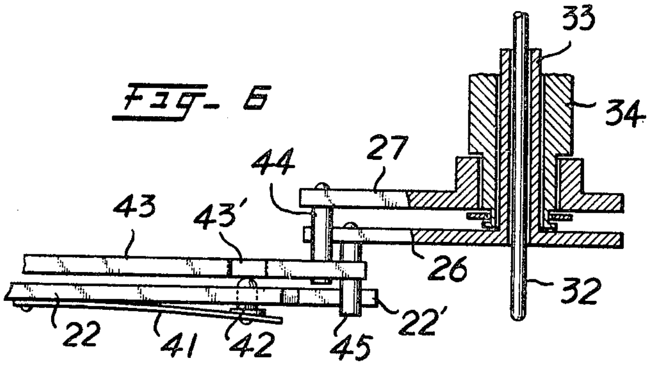
FIG. 6 is a longitudinal sectional view taken along the line VI—VI of FIG. 4.
Figure 7:
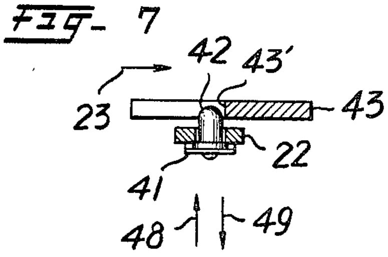
FIG. 7 is a longitudinal sectional view taken along the line VII—VII of FIG. 5.
Figure 8:
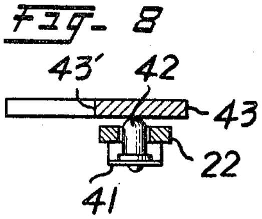
FIG. 8 is a longitudinal sectional view taken along the line VIII—VIII of FIG. 4.

Near the front end of the horizontally pivoting lever 22 is mounted, as shown in FIGS. 6 to 8, with a pin 42 having a rounded upper end which is urged upwardly by a plate spring 41 to bear against the follower lever 43, which has a cutout 43′ into which said pin 42 projects when the horizontally pivoting lever 22 and the follower lever 43 overlap one over the other as shown in FIG. 5 (see FIGS. 7 and 8).

The operation of the mechanism according to this invention will now be explained. To facilitate explanation, description will begin with the mechanism in the playing condition.

As the performance progresses, the pickup arm 14 moves in pivotal motion in the direction of arrow *a* in FIG. 2, and the arm lever 26 moves in pivotal motion in the direction of arrow 46 (FIGS. 2, 4 and 5) in conjunction with said movement of the pickup arm 14. As the pickup arm 14 is introduced into a lead-out portion of the record being played after the performance has been finished, the pivotal motion of the pickup arm is expedited, so that the arm 26′ of the arm lever 26 pushes the gear operating rod 21 to bring a pawl 20 mounted on the cam 19 into meshing engagement with the teeth 18′ of a turntable gear 18. This causes the gear 19, which has been out of meshing engagement with the turntable gear 18 because of a toothless portion 19‴ being in engagement with the turntable gear 18, to rotate. As the gear 19 rotates, the vertically pivoting lever 25 is caused by the cam crest 19″ to move in pivotal motion in the direction of arrow 38 (FIG. 3). The pivoting of the lever 25 causes, through the push-up lever 32, the pickup arm 14 to move upwardly in the direction of arrow 39 (FIG. 3).

Then, the horizontally pivoting lever 22 is caused by the eccentric cam groove 19′ to move in pivotal motion in the direction of arrow 24 (FIGS. 2, 4 and 5), so that the front end 22′ of said lever 22 pushes the pin 45 mounted on the arm lever 26 and causes the same to move in the direction of arrow 47 (FIGS. 2, 4 and 5).

Since the pickup arm 14 moves horizontally in pivotal motion in conjunction with the arm lever 26 as a unit, the pickup arm 14 moves in pivotal motion in the direction of arrow *b* (FIG. 2) to return to a position on a rest. The positioning plate 27 also moves in pivotal motion in the same direction as the pickup arm 14, for the pin 44 mounted on the positioning plate 27 is pushed by the arm 26″ of the arm lever 26. At the same time, the pin 42 mounted on the horizontally pivoting lever 22 projects, as shown in FIGS. 5 and 7, into the cutout 43′ formed in the follower lever 43. The movement of the follower lever 43 is restricted by a stopper 50, so that this operation can be performed positively.

As the rotation of the gear 19 progresses, the horizontally pivoting lever 22 changes the direction of its movement to move in pivotal motion in the direction of arrow 23 (FIGS. 2, 4 and 5), causing, through pin 42, the follower lever 43 to move in pivotal motion in the same direction as the lever 22. Accordingly, the front end 43″ of the follower lever 43 pushes the pin 44 mounted on the positioning plate 27 and causes the same to move in pivotal motion in the direction of arrow 46 (FIGS. 2, 4 and 5). The positioning plate 27 is arrested in its pivotal motion when one of the offset portions 27′, 27″ and 27‴ impinges on the rod 28 which projects in an amount corresponding to the position at which the knob 15 is set to switch the sizes of records, so that the follower lever 43 is also arrested in its pivotal motion. Since the horizontally pivoting lever 22 continues to move in pivotal motion, however, pin 42 slips out of the cutout 43′ to move in the direction of arrow 49 shown in FIG. 7 by dint of the roundness of the upper end thereof, so that the lever 22 leaves the follower lever 43 behind in its pivotal motion till it reaches a position shown in FIG. 2.

As the positioning plate 27 moves as aforementioned in pivotal motion, the arm lever 26 also moves in pivotal motion because the arm 26″ is pushed by pin 44, causing the pickup arm 14 to move to a position immediately above the lead-in groove of a record of selected size.

Then, the vertically pivoting lever 25 moves in pivotal motion in the direction of arrow 37 (FIG. 3) to cause the pickup arm 14 to move downwardly, so that the player can begin to play the record selected. By that time, the toothless portion 19‴ of the gear 19 has been brought to a position in face-to-face relationship with the turntable gear 18 to cause the gear 19 to stop rotating.

Even if the movement of the pickup arm 14 is accelerated by the lead-in groove immediately after it has descended on the record, nothing interferes with, and arrests this movement of the pickup arm 14, since the horizontally pivoting lever 22 has already been brought out of engagement with pin 45 and pin 44 is positioned in the direction opposite to the direction of movement of the pickup arm 14.

From the foregoing description, it will be apparent that the pickup arm control mechanism according to the present invention enables to bring the pickup arm out of engagement with means for moving the pickup arm horizontally in pivotal motion before the pickup arm begins its downward movement, the arrangement obviates the disadvantage of the prior art of a variation in the height of the surface of the uppermost record on a turntable interfering with the movement of the pickup arm so that the player begins to play a record while the pickup arm remains arrested in its movement, and the disadvantage of the prior art of the pickup arm descending at an indefinite position on a record due to the shock caused by disengagement of the pickup arm from means for moving the pickup arm horizontally in pivotal motion is also obviated by the mechanism according to this invention.

In the embodiment of the invention described hereinabove, pin 42 and cutout 43′ are relied on for bringing the horizontally pivoting lever 22 and the follower lever 43 into engagement with each other. However, the invention is not limited to this specific structural arrangement, and changes may be made therein without departing from the scope of the invention. What is important is that the two levers 22 and 43 may be constructed such that one lever can readily slip out of engagement with the other lever when the follower lever 43 is arrested in its movement. Some examples of modified forms are shown in FIGS. 9 to 11.

Figure 9:
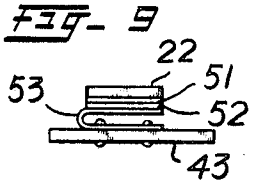
FIGS. 9, 10 and 11 are views showing second, third and fourth embodiments, respectively, of the structural arrangement in which a horizontally pivoting lever and a follower lever are brought into engagement with each other.

FIG. 9 shows an example in which a friction plate 51 affixed to the underside of the horizontally pivoting lever 22 is brought into contact with a friction plate 52 mounted on a spring 53 affixed to the upper surface of the follower lever 43 so that the two levers 22 and 43 may be brought into frictional engagement with each other.

Figure 10:
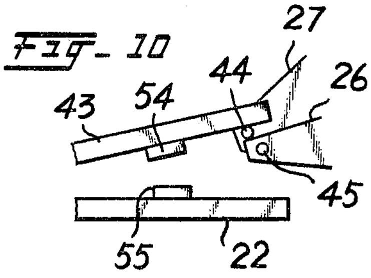

In FIG. 10 is shown another example in which magnets 54 and 55 are affixed to the sides of the two levers 22 and 43 so that said two levers may be brought into engagement with each other by magnetic force.

Figure 11:
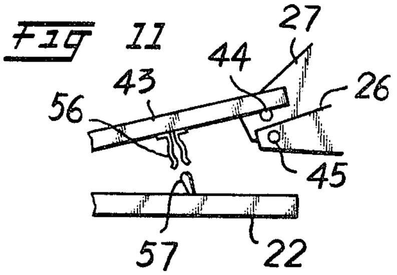

The other example shown in FIG. 11 is provided with snap assemblies 56 and 57, instead of magnets, for bringing the levers 22 and 43 into engagement with each other. The examples shown in FIGS. 9 to 11 operate as satisfactorily as the structural arrangement described hereinabove with reference to the first embodiment of this invention.

An automatic record size detector, which operates when records are changed, may be employed in place of the knob 15 for selecting the size of a record.

It is to be understood that the invention is not limited to the specific forms of the embodiments shown and described hereinabove, and that many changes may be made therein without departing from the spirit of the invention.

What I claim is:

1. A pickup arm control mechanism comprising a pickup arm having a rotary shaft, an arm lever coaxially secured to said rotary shaft for pivotal motion in conjunction with said pickup arm, a positioning plate coaxially secured to said rotary shaft and adapted to be movable about said rotary shaft in pivotal motion, a rotatable cam gear, a horizontally pivoting lever having a follower member contacted with said cam and adapted to cause said arm lever to move in pivotal motion in only one direction as said cam gear is rotated, a follower lever adapted to move in pivotal motion about the same axis as that of said horizontally pivoting lever and to cause said positioning plate to move in pivotal motion in only the opposite direction to said one direction, means on said arm lever and said positioning plate for moving in pivotal motion said positioning plate in only said one direction by the pivotal motion of said arm lever and means on said follower lever and said positioning plate for moving in pivotal motion said arm lever in only said opposite direction by the pivotal motion of said positioning plate, means for stopping the movement of said positioning plate at a predetermined position in said opposite direction, and means for engaging said follower lever with said horizontally pivoting lever at a predetermined relative pivotal angle between said follower lever and said horizontally pivoting lever and releasing the engagement of said follower lever with said horizontally pivoting lever by the movement of said horizontally pivoting lever in said opposite direction when the movement of said follower lever is stopped by the stop of the movement of said positioning plate owing to said means for stopping the movement of said positioning plate.

2. A pickup arm control mechanism as defined in claim 1 wherein said means for engaging said follower lever with said horizontally pivoting lever and releasing the engagement includes a cutout formed on one edge of said follower lever and a projection mounted on said horizontally pivoting lever and adapted to be received in said cutout.

3. A pickup arm control mechanism comprising:

(a) a pickup arm having a rotary shaft, (b) an arm lever coaxially secured to said rotary shaft for pivotal motion in conjunction with said pickup arm, (c) a positioning plate coaxially secured to said rotary shaft and adapted to be movable about said rotary shaft in pivotal motion, (d) a cam gear, (e) a cam crest formed concentrically on said cam gear and having an irregular height, (f) a cam groove formed non-concentrically in said cam gear, (g) a vertically pivoting lever having one end maintaining contact with said cam crest and the other end moving upwardly and downwardly in pivotal motion in accordance with the changes in height of said cam crest, (h) a pickup arm pushup lever moved upwardly and downwardly by said other end of said vertically pivoting lever to move said pickup arm upwardly and downwardly, (i) a horizontally pivoting lever having a follower member received in said cam groove and adapted to cause said arm lever to move in pivotal motion in only one direction as said cam gear is rotated, (j) a follower lever adapted to move in pivotal motion about the same axis as that of said horizontally pivoting lever and to cause said positioning plate to move in pivotal motion in only the opposite direction to said one direction, (k) means on said arm lever and said positioning plate for moving in pivotal motion said positioning plate in only said one direction by the pivotal motion of said arm lever and means on said follower lever and said positioning plate for moving in pivotal motion said arm lever in only said opposite direction by the pivotal motion of said positioning plate, (l) means for stopping the movement of said positioning plate at a predetermined position in the path of the movement thereof in said opposite direction, and (m) means for engaging said follower lever with said horizontally pivoting lever at a predetermined relative pivotal angle between said follower lever and said horizontally pivoting lever and releasing the engagement of said follower lever with said horizontally pivoting lever by the movement of said horizontally pivoting lever in said opposite direction when the movement of said follower lever is stopped by the stop of the movement of said positioning plate owing to said means for stopping the movement of said positioning plate, (n) said cam groove being formed to cause said horizontally pivoting lever to move in pivotal motion over the position where said follower lever is released from said horizontally pivoting lever, and (o) said cam crest being formed to cause said pickup arm to move upwardly by said vertically pivoting lever before said horizontally pivoting lever starts to move in said one direction by the follower member received in said cam groove and cause said pickup arm to move downwardly after said positioning plate has halted at said predetermined position.

4. Apickup arm control mechanism comprising:

(a) a pickup arm having a rotary shaft, (b) an arm lever having two end portions and being coaxially secured to said rotary shaft for pivotal motion in conjunction with said pickup arm, one of said two end portions having a pin mounted thereon, (c) a positioning plate coaxially secured to said rotary shaft and having on one end portion thereof a pin adapted to be brought into contact with said one of the two end portions of said arm lever and offset portions on the other end portion thereof, (d) a turn table having a turn table gear, (e) a cam gear having a pawl, (f) a cam crest formed concentrically on said cam gear and having an irregular height, (g) a cam groove formed non-concentrically in said cam gear, (h) a vertically pivoting lever having one end maintaining contact with said cam crest and the other end moving upwardly and downwardly in pivotal motion in accordance with the changes in height of said cam crest, (i) a pickup arm pushup lever moved upwardly and downwardly by said the other end of said vertically pivoting lever to move said pickup arm upwardly and downwardly, (j) a horizontally pivoting lever having a follower member received in said cam groove and adapted to cause said arm lever to move in pivotal motion in only one direction by an engagement of one end portion of said horizontally pivoting lever with said pin of the arm lever as said cam gear is rotated, (k) a follower lever adapted to move in pivotal motion about the same axis as that of said horizontally pivoting lever and to cause said positioning plate to move in pivotal motion in only the opposite direction to said one direction by an engagement of one end portion of said follower lever with said pin on the positioning plate, (l) a gear operating rod adapted to be movable so as to push said pawl by one end portion thereof, (m) means for engaging said cam gear with said turn table gear by contacting said pawl with said turn table gear through said gear operating rod, the other end portion of which is engaged with the other of two end portions of said arm lever at a predetermined position in the path of pivotal motion of said arm lever in said opposite direction, (n) means for moving in pivotal motion said positioning plate in only said one direction and said arm lever in only said opposite direction by the engagement of said pin of said positioning plate with said one of two end portions of said arm lever, (o) arresting means adapted to abut against one of said offset portions of the positioning plate to arrest said positioning plate in its pivotal motion of said opposite direction, and (p) means for engaging said follower lever with said horizontally pivoting lever at a predetermined relative pivotal angle between said follower lever and said horizontally pivoting lever and releasing the engagement of said follower lever with said horizontally pivoting lever by the movement of said horizontally pivoting lever in said opposite direction when the movement of said follower lever is stopped by the stop of the movement of said positioning plate owing to said arresting means, (q) said cam groove being formed to cause said horizontally pivoting lever to move in pivotal motion over the position where said follower lever is released from said horizontally pivoting lever, and (r) said cam crest being formed to cause said pickup arm to move upwardly by said vertically pivoting lever before said horizontally pivoting lever starts to move in said one direction by the follower member received in said cam groove and cause said pickup arm to move downwardly after said positioning plate has been stopped by said arresting means.

References Cited

UNITED STATES PATENTS

| | | | |
|---|---|---|---|
| 3,030,115 | 4/1962 | Hardy et al. | 274—10 |
| 3,023,009 | 2/1962 | Dale | 274—10 |
| 2,898,114 | 8/1959 | Vistain | 274—10 |

LEONARD FORMAN, *Primary Examiner.*

F. J. D'AMBROSIO, *Assistant Examiner.*